United States Patent [19]

Sawyer et al.

[11] Patent Number: 4,530,700
[45] Date of Patent: Jul. 23, 1985

[54] METHOD AND APPARATUS FOR USE IN PREPARING BIOMASS PARTICLES FOR FUEL AND FOR USE AS CHEMICAL FEED STOCK

[76] Inventors: Willard C. Sawyer; Edith M. Sawyer; Sherron M. Keef; John W. Sawyer, all of R.F.D. #2, Oxford, Me. 04270

[21] Appl. No.: 580,334

[22] Filed: Feb. 15, 1984

Related U.S. Application Data

[63] Continuation-in-part of Ser. No. 383,087, May 28, 1982, abandoned, and Ser. No. 360,197, Mar. 22, 1982, abandoned, said Ser. No. 383,087, is a continuation-in-part of Ser. No. 265,181, May 19, 1981, abandoned, which is a continuation-in-part of Ser. No. 231,376, Feb. 26, 1980, , which is a continuation-in-part of Ser. No. 3,794, Jan. 16, 1979, abandoned, which is a continuation-in-part of Ser. No. 848,511, Nov. 4, 1977, abandoned.

[51] Int. Cl.³ .................. C10L 9/08; C10L 11/08; C10J 3/46
[52] U.S. Cl. .......................... 44/1 E; 44/2; 44/10 B; 34/13.8; 34/227; 110/224; 110/229; 241/28
[58] Field of Search .............. 44/1 E, 2, 10 B; 34/13.8, 16.5, 38.0, 145, 175, 225, 227, 237; 48/209; 241/28; 110/224, 229

[56] References Cited

U.S. PATENT DOCUMENTS

| | | | |
|---|---|---|---|
| 1,102,591 | 7/1914 | Kalitsch | 44/10 B |
| 2,299,248 | 10/1942 | Ottersland | 144/176 X |
| 2,440,940 | 5/1948 | Galusha | 48/76 |
| 2,799,563 | 7/1957 | Shenker | 44/40 |
| 3,064,592 | 11/1962 | Eberhardt | 44/1 E |
| 3,240,573 | 3/1966 | Eyre, Jr. | 44/13 |
| 3,973,922 | 8/1976 | Williams | 44/13 |
| 4,015,951 | 4/1977 | Gunnerman | 44/10 E |
| 4,229,183 | 10/1980 | Eneroth et al. | 44/1 E |

Primary Examiner—Carl F. Dees

[57] ABSTRACT

Biomass is prepared for use as a fuel or chemical feed stock either by processing biomass to provide particles or by utilizing such particles that have been independently produced, in either case at a location remote from consuming sites. At a thus situated location, particles are delivered to at least one gas producing section and to a drying section with hot producer gas utilized in the drying section in a manner to so reduce the moisture content of the particles as to render the particles a more efficient fuel or chemical feed stock. A minor portion of the producer gas is or may be used for various purposes such as fuel for a power plant to operate conveyors and particle forming apparatus, drying or heating of particles being delivered to the sections, or drying of particles subsequently to be consumed at the same or other particle producing site, in any case enabling biomass particles to be processed at sites remote from consuming sites with an economic advantage attained between the dried particles and undried particles.

51 Claims, 6 Drawing Figures

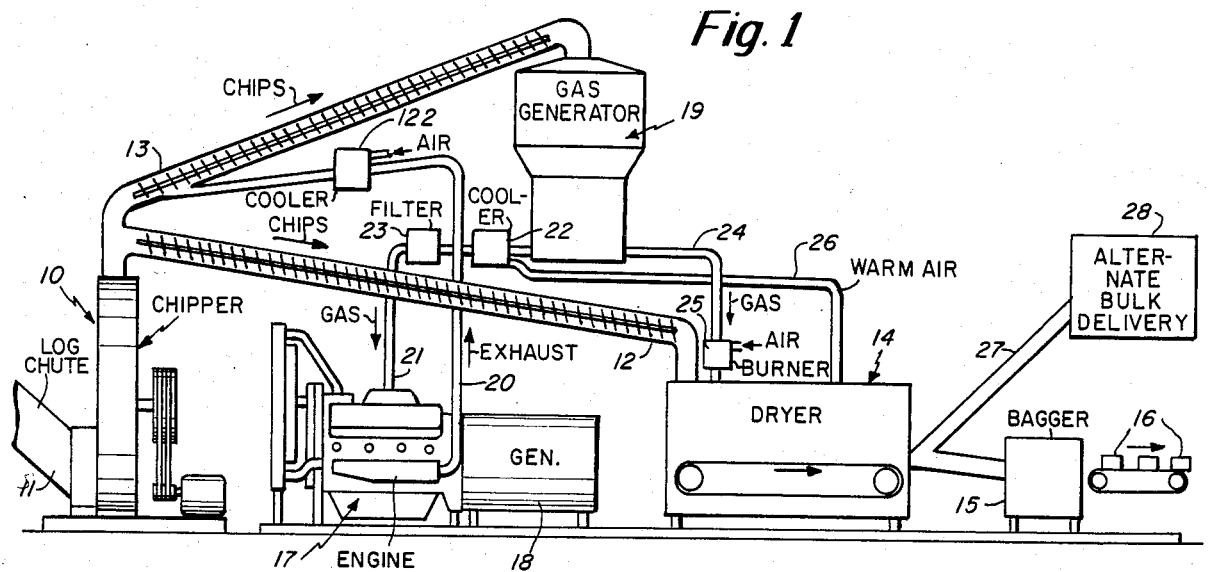
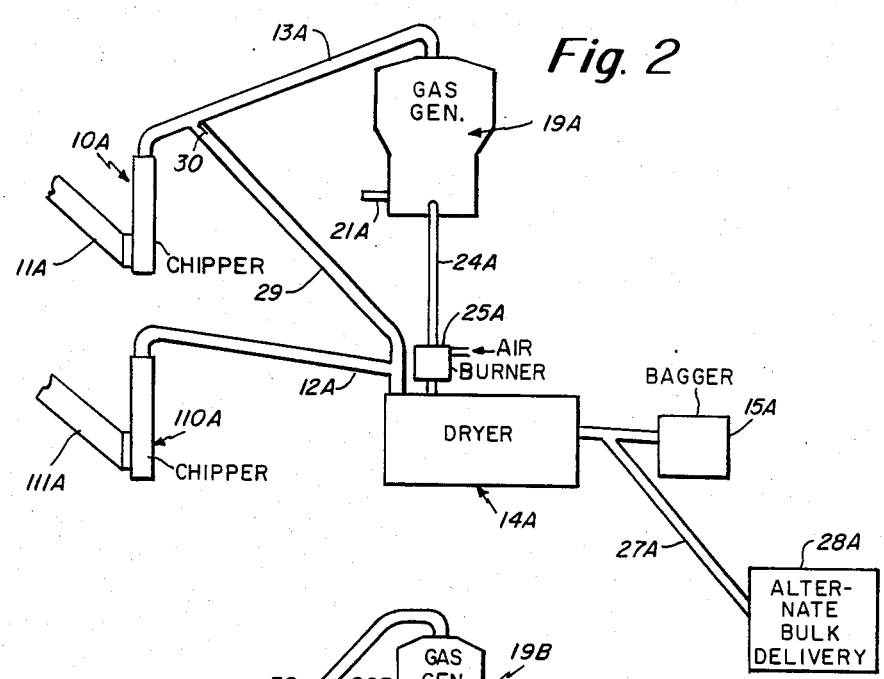
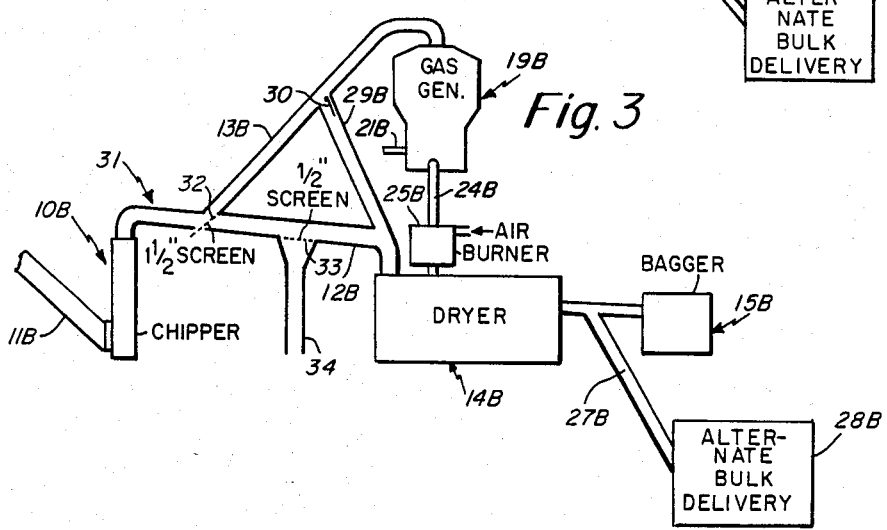

METHOD AND APPARATUS FOR USE IN PREPARING BIOMASS PARTICLES FOR FUEL AND FOR USE AS CHEMICAL FEED STOCK

The present application is a continuation-in-part of our copending application, Ser. No. 383,087, filed May 28, 1982, now abandoned; as a continuation-in-part of Ser. No. 265,181, filed May 19, 1981, now abandoned; as a continuation-in-part of Ser. No. 231,376, filed Feb. 26, 1980; as a continuation-in-part of Ser. No. 3,794, filed Jan. 16, 1979, now abandoned; as a continuation-in-part of Ser. No. 848,511, filed Nov. 4, 1977, now abandoned; and a continuation-in-part of Ser. No. 360,197, filed Mar. 22, 1982, now abandoned.

RELATED APPLICATION

"Method of Processing Biomass Particles", Ser. No. 288,751, filed July 31, 1981.

BACKGROUND REFERENCES

U.S. Pat. No. 4,015,951
U.S. Pat. No. 3,973,922
U.S. Pat. No. 3,240,573
U.S. Pat. No. 2,440,940
U.S. Pat. No. 2,290,248

BACKGROUND OF THE INVENTION

Biomass is a renewable energy source and a renewable source of chemical feed stock and while a principal fuel at one time, its use for that purpose declined until recently. Its use today is increasing because of the high cost of other fuels and it would be used more extensively not only for domestic but also industrial uses if it were more convenient to handle and if its moisture content could be reduced, on an economical basis, to increase its value as a fuel and feed stock, one major facet of value enhancement being the lower capital costs associated with conversions to dry biomass particles.

Wood, as a fuel for domestic uses, must be harvested, typically in four foot lengths, later cut into lengths appropriate for fireplace, furnace, stove or heater uses, split, air dried, and stored. As a consequence, if such wood is purchased ready for use, even in cord lots, its cost is substantial but in stoves and heaters of efficient design, it can have a thermal efficiency, if air dried, as high as sixty percent. The moisture content of air dried wood is typically in the neighborhood of twenty-five percent.

That the thermal efficiency of wood is inherently dependent on its moisture content is established by noting that green wood has, on the average, a moisture content in the neighborhood of fifty percent so that, for example, thirty-five pounds of kiln dried wood will have lost about thirty pounds of water, wet basis. Wood that is termed "kiln dry" has a moisture content in the five to eight percent range. Assuming the burning of that wood when green, the BTU required to drive off that water represents a minimum loss of about eight percent in heating value. In addition the substantial volume of air required to keep such wood burning represents an even greater loss and it has been determined that the heating capacity of green wood is less than two thirds that of kiln dry wood at the time of burning.

Drying biomass particles at a remote site increases its value for use as chemical feed stock in that it reduces the end product cost, removes water vapor or steam from the end product and, in some cases, when water is required to process the feed stock, remote drying allows waste steam and low temperature water or weak combinations of useful chemicals or both, singly or in combination, to be reclaimed when added to the dry feed stock.

It has, of course, been recognized that wood harvesting for lumber and paper mills results in much waste in the form of branches, tops, and trunks found, after cutting, to be unfit for use. As far as we are aware, no economically attractive proposal has been made enabling such waste wood to be converted into fuel or chemical feed stock.

The problem has been that in the past the collection, handling and transportation of the many small crooked pieces of previously wasted tops, branches and culls has been more expensive than their value as raw material for paper, boards, or other manufactured products. Particularly this is true when one considers that most if not all of such manufactured products require that the bark be removed prior to such use and that these small crooked pieces cannot be economically de-barked. Now, however, the cost of conventional fuel has increased to the point that certain types of wood and wood-waste can now compete with coal, gas and oil as a source of fuel and feed stock. Tops, branches and culls now left in the forest could now also be competitive as fuel or chemical feed stock if a method of economical collection, handling and transportation were available. Another source of wood wastes for fuel are so-called manufacturing wastes which have little value unless upgraded prior to transportation.

For instance, one source of particles could be logging operations in the United States which leave the equivalent of five hundred million barrels of oil rotting on the ground each year. In addition forty-five percent of all forests in the United States are non-operable wood lots which are overstocked with small trees. If sufficient market for forest residues can be developed as much as ten million barrels in oil equivalent of forest residues can be economically obtained each year on a sustained and renewable basis by intergrating logging operations to remove both round wood and residues. By developing a market for these residues the presently non-operable (non-commercial quality) wood lots can be returned to high productivity on shorter rotation while providing income to the landowner; profit to the logger; and replacement of foreign oil. However, even with the pressures created by substantially higher oil prices since 1973, markets for these residues have developed very, very slowly. Capital costs for traditional conversion technologies have been too high and pay out periods too long so that potential users have perceived risks too high for such capital projects when compared with other opportunities for investment having lower perceived risks and shorter pay out terms. What is needed is new technology which will allow conversion by means requiring substantially lower capital moneys to be supplied by the user. For instance, but not by way of limitation, a power boiler of a size used by the pulp and paper industry may be installed for dry wood particles at a capital cost from twenty percent to thirty percent lower than that required for green particles. Further capital and operating economies are gained by transferring the surge pile which is traditionally placed directly in front of the conversion facility to locations in part within the logging operation and in part within the transport system. This is possible when chips are dried before transport because dry chips do not freeze, deteiorate or spontaneously catch fire as do green particles. By employing the technology taught by this application, vendors of particles may offer dry particles which reduce the perceived risks and the payback term so that markets for residue particles from logging operations, for instance but not by way of limitation, may prevail over other money saving projects which is seldom the case employing traditional green particle conversion means.

To fulfill this objective a simple system not requiring expensive clean-up of products of combustion has been needed but has not been heretofore available in a form that would allow remote drying in a safe manner which assured freedom from carrying sparks over to the dryer. The use of a gasifier which by design delivers essentially a stream of gas and suspended liquid or vapor phase materials and which stream does not require expensive and power consuming stream cleaning devices either before of after combustion makes remote drying economically possible. As an example but not limitation, an economic analysis by Austin Associates of Auburn, Maine, employing recognized accounting methods shows a conversion system converting dry particles received from the system which is the subject of this application at a moisture content of fifteen percent wet basis can save substantial annualized costs when paying fifty dollars per ton for dry particles during the payback term while employing dry fuel conversion technology as opposed to paying $18.75 per ton for green particles at 50% M.C. while employing more expensive green particle conversion technology. Another study by Energetics Incorporated of Columbia, Md., shows that the method and apparatus taught by this application when employed to process forest residues can profitably process and deliver loads of 15% M.C. wood particles at fifty dollars per ton. This study was completed in Jan. 1984.

The most economical mode of handling and transporting such waste wood is that of reducing such material to particles and then removing the unwanted water as close as possible to the site where they are available prior to transporting the wood particles beyond that area. Such a method has not been previously practiced for the want of the right combination of equipment and technology applied in the proper sequence to make the collection of this waste wood economically attractive.

THE PRESENT INVENTION

The general objective of the present invention is to provide a basis enabling biomass including waste wood and bark to be processed at or near the site where it is available in the woodland or some other suitable site in the form of particles within a predetermined size range and processed for use as fuel or chemical feed stock on an economical basis.

In accordance with the invention, this objective is attained by utilizing particles as received from chippers and/or hoggers and produced from the harvested material with those from a chipper or chippers delivered to a gas producing section where they are subjected to gasification to provide at least one stream of hot fuel gas. Such particles from chippers and/or hoggers are also delivered to a drying section where the hot fuel gas is utilized in a manner enabling the moisture content of the particles to be reduced to a wanted extent without adversely affecting them. A relationship is established between the volume of particles delivered to the gas producing section and the volume of particles delivered to the drying section such that the moisture content of the dried particles is reduced in the approximate range of five percent to forty percent, wet basis, while maintaining an economic advantage between the dried particles and the value of undried particles. It will be appreciated that an important factor in determining economic advantage is the annualized costs of converting to dry particles during the payback period for the capital equipment required for conversion.

The relationship between the volume of particles to be utilized in producing hot fuel gas and the volume of particles to be dried on an economical basis is dependent on other uses for which hot producer gas may be required in accordance with various other objectives of the invention which include the use of such gas to provide fuel for a prime mover by which power is provided for such uses, separately or in various combinations, as operating particle forming means, conveyors, blowers, hoggers, and compacting means. In addition, the drying section may include a plurality of dryers of the same or different sizes and types.

Wood, including waste wood and bark at or near the harvesting or other suitable site is converted into particles which are thereby so transformed from their original crooked and unwieldly state, that they can now be economically handled, compacted and then transported with significant cost savings. A dryer is provided which may be either of the batch type or the continuously operated type. If the former the dryer may be filled and emptied by any suitable means, while if the latter conveying means are used. The apparatus may include means to package predetermined amounts of dry particles in combustible material to provide fuel units that are protected against absorbing moisture, a bulk delivery outlet, or both.

Particles are delivered along a path which includes at least one gas producing section which may be operated at the site where the particles are produced or at some other convenient site for the purpose of converting particles to fuel gas thereby providing fuel to heat the dryer.

In most embodiments of the invention, the major portion of the producer gas is used for particle drying in the drying section and a minor portion employed for heating particles prior to their delivery to either the gas producing section, the drying section, to both sections, or to a separate drying section to provide fuel for the same gas or another remotely located producing section, in any case the particles dried at the drying section on an economically advantageour basis.

As specific examples of uses of a minor portion of hot producer gas, reference is made to the following uses either singly or in various combinations; fuel to power the particle producing section, fuel to power conveyors and blowers required to operate the drying section, or sections, and fuel by which drying in another drying section may be effected with both the major and minor portions of hot gas derived from a single gas generator or with the minor portion derived from a second gas generator.

When gas from a producer section is employed to produce power it is first cleaned and cooled and then consumed in an internal combustion engine or a turbine. The hot air from the heat exchanger used to cool the gas is preferably delivered to the dryer. The dry particles may be carried to a station where they may be packaged for distribution or carried in bulk to a consuming site provided that the processed particles do not absorb moisture in transit.

While the method of invention is in general apparent from the above description of the apparatus, an essential feature of both method and apparatus is that the efficiency of the gas producing means is such that the volume of particles utilized by the gas producer section for its functions is less than the volume of dried chips with the ratio between the two volumes such that an economic advantage is maintained between the dried particles and the BTU requirement to effect their drying.

The term "particles" as used herein and in the claims means hard or soft wood chips and wood and bark fragments, no matter how formed. While such fines as sawdust can be accommodated in amounts in the fuel units and gas producers can be designed to utilize fines, the particles delivered to the gas producing section must be those as produced by properly operated and maintained chippers for the gas producing section. The elimination of slivers from the particles may be accomplished by screening or or by featues built into the chippers. For the drying sections, the particles may be those produced by chippers and/or hoggers. It is thus established that particles of different nature and properties may flow simultaneously along the various paths if such is desired. The invention is herein discussed primarily with reference to the forming of the particles by chippers, by way of example but not of limitation.

In some cases, the wood particles are chips such as are produced for pulp mill use, in other cases smaller particles are employed, and in yet another situation both types of particles may be used and divided between the two paths as required for the efficient production of the dry particles.

In accordance with the invention, the moisture content of the dried particles is in the approximate range of from five to forty percent, wet basis. While the lower the moisture content, the greater the advantage in reducing transportation costs, capital costs for conversion and the greater the thermal value, the percentage of the total production required to effect low level drying is also increased. At the higher levels, the advantage may be simply to bring certain particles into the moisture range most desired for existing conversion equipment. For the lower ranges an ever increasing variety of new technologies is available which reduce capital costs of conversion.

A particular objective of the invention is to provide vapor-protected dry particles of a packaged size such that they may be used in any domestic heating equipment as an easily ignited unit with each unit of a size and weight that may be easily handled.

Other objectives of the invention will be apparent from the accompanying specification and the appended claims.

BRIEF DESCRIPTION OF THE DRAWINGS

In the accompanying drawings, preferred embodiments of the invention are illustrated:

FIG. 1 is a schematic view of the apparatus required to carry out the invention and enabling the several steps required by the method to be readily understood;

FIG. 2 is a like view of the particle producing section of apparatus utilizing two chippers, each for producing particles of different sizes;

FIG. 3 is a like view of the corresponding part of apparatus in accordance with another embodiment of the invention where the production of a single chipper is divided into two parts with the particles of each part within a predetermined different size range;

THE PREFERRED EMBODIMENTS OF THE INVENTION

Figure 4:
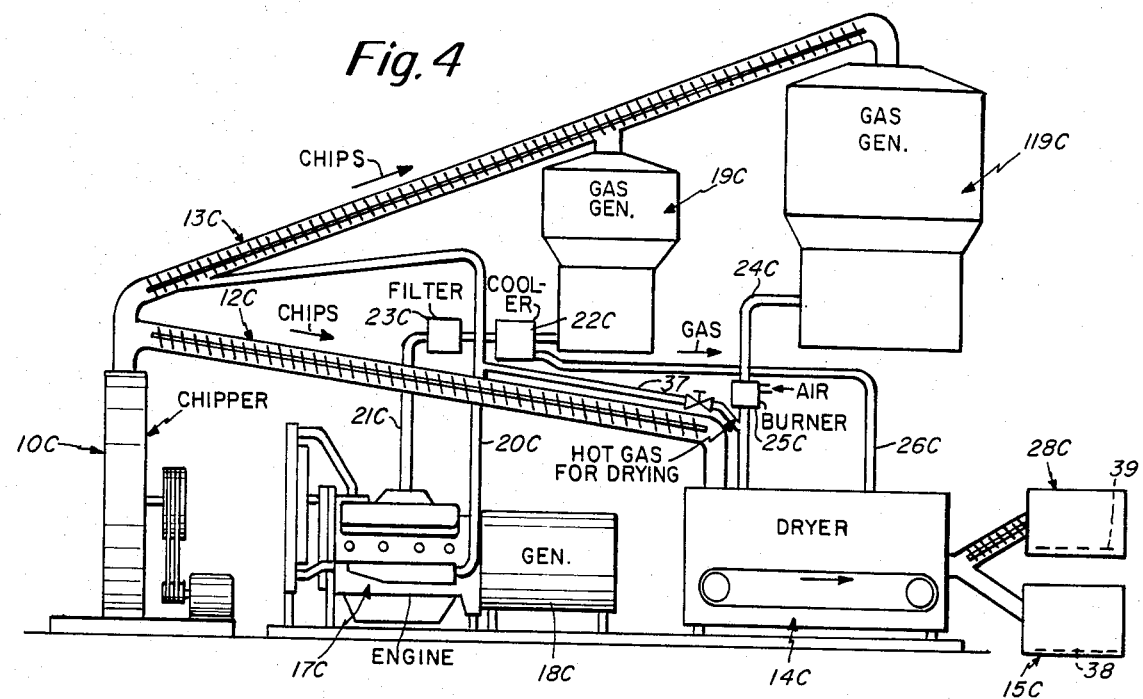
FIG. 4 is a schematic view of another embodiment of the invention, the apparatus of the type illustrated in FIG. 1 but with the gas producing section provided with two separate producers.

The apparatus illustrated by FIG. 1 includes a chipper generally indicated at 10, provided with an infeed chute 11 for harvested wood. The chipper 10 has first and second outfeed conveyors 12 and 13, respectively, and not detailed as they may be of any type that meets the requirements of a particular installation.

Wood chippers are well known with a typical construction shown in U.S. Pat. No. 2,299,248 and efficient chippers are manufactured by Morbark Mfg. Co., Inc. of Winn, Mich., and M. B. Company, Inc. of New Holstein, Wis.

The first conveyer 12 delivers particles to a dryer generally indicated at 14. The dryer may be a drum dryer or one such as is manufactured by C. G. Sargent's Sons Corporation of Graniteville, Mass., or of some other satisfactory type, and it may be either of the batch type or one operating continuously. The dry particles are shown as being delivered from the dryer 14 to a station 15 where the particles are packaged in combustible, vapor proof materials to provide fuel units 16 of desired dimensions and weight that are ready to be burned. The particles may also be transported in bulk when properly protected from moisture via alternate conveying means.

A power plant for operating the apparatus included an internal combustion engine or turbine 17 and a generator 18 driven thereby. The chipper 10 may be driven directly by the engine 17, or, as shown, by a motor driven by the generator output. The output of the generators 18 is preferably adequate for the operation of all components of the apparatus thus to avoid or minimize the use of other portable generators.

The second conveyor 13 delivers particles to a gas producing station or section generally indicated at 19, and containing at least one gas producer or generator, commonly called a gasifier regardless of its specific construction, see U.S. Pat. No. 2,440,990 for one type of such a producer. The hot exhaust gases from the engine 17 are employed to help dry the particles, preferably those used in gas production, by discharging them into conveyor 13 via a conduit 20 either in a counterflow relation to the chips being conveyed or, as shown, into the conveyer 13 adjacent the chipper. The conduit 20 contains a blender or cooler 122 operable to bring the exhaust gas temperature into the approximate range of from 200° F. to 600° F. Such gas producers generate a hot gas that, as is well known, is a useable fuel. To that end, the gas producing section 19 has a conduit 21 provided with a cooler 22, preferably of the air cooled type, and a filter 23 in communication with the intake of the engine 17. In accordance with the present invention, the gas producing section 19 has a second fuel delivery conduit 24 in communication with a burner 25 the hot products of combustion from which are delivered into the interior of the dryer 14 as the drying medium for the particles therein. Warm air from the cooler 22 is delivered to the dryer 14 by a conduit 26 to moderate the temperature of the hot gas stream from the burner 25 since the gases may reach 2000° F. or higher and the temperature within the drying chamber should be within the approximate range of 200° F.–600° F., preferably between 250° F. and 300° F. Desirably, and as shown, there is alternate conveying means 27 leading from the dryer 14 to a station 28 from which bulk delivery is started.

Reference has been made to the fact that the dryer may be either of the continuous type or the batch type. If the former, the associated conveyors are to be operated continuously while, if of the latter type, the associated conveyors are to be operated intermittently as required for its loading and unloading.

The components of the apparatus are adapated to be transported from one harvesting site to another and set up where harvested wood can be delivered to the chipper 10 on the most efficient and economical basis. The site may be where other harvesting operations are in progress. Where the apparatus may be located at a more or less permanent and centrally located collection site, the feature of mobility is of less importance but as it is preferred that waste wood, usually left in the forest, can be harvested and converted into fuel, mobility of the apparatus is a desirable feature.

It should be noted that, while desirable and preferred, it is not necessary that the particles be bagged directly upon their discharge from the dryer, for they may be carried to a remote bagging station provided that they can be protected in transit from absorbing moisture. It should also be noted that for industrial uses or for transportation to a bagging station, the station 28 may be one where the particles are compacted by vibration. In the bulk shipment of dried particles means providing protection against moisture absorption during transit of the unpackaged dry particles are in most areas, a requirement.

As illustrated by FIG. 2, a chipper 10A and a second chipper or hogger 110A may be used with the latter used to process wood from a different source than that for use in the chipper 10A.

In FIG. 2, the output of the chipper 110A is shown as delivered into the conveyer 13A provided with a branch 29 to the dryer 14A and with a gate 30 enabling, depending on the volume of particles being produced, only the supply of particles needed for the operation of the gas producing section 19A to be delivered thereto with the remainder transferred to the dryer 14A.

In FIG. 3, the chipper 10B is adapted to so process wood that particles may vary considerably in size and accordingly it includes an outfeed section 31 including a screen 32 which rejects splinters from the flow to the gasifier. Small gasifiers require protection from splinters as small as three inches or less in length while larger gasifiers need protection from splinters of only four or more inches. The degree of protection must be that which assures reliable feed into the gasifier. In still another situation it may be desired to provide the screening function shown at 33 be performed after drying is accomplished. In that case station 33 would appear after the dryer.

Turning again to the gas producing section of the previously described embodiments, each such section may contain more than one gas producer depending on such factors as the gas volumes needed and the side and weight of the producers, particularly when portability is a consideration.

FIG. 4 illustrates apparatus where more than one gas producer is a desirable feature. That embodiment of the invention is similar to that of FIG. 1 in that a power plant consisting of an engine 17C and a generator 18C provide the electricity to operate the motors that drive the chippers 10C, the conveyers 12C, 13C, and the conveyer of the dryer 14C and the conveyers of whatever equipment is provided to handle the dried chips.

As the volume of gas required for the efficient operation of the dryer 14C may be substantially greater than that required by the power plant, the gas producing section has two gas producers, the gas producers 19C and 119C. The conveyer 13C is provided with branches delivering wood chips to the gas producers 19C and 119C, respectively, in quantities appropriate for their operation.

It should be here noted that the moisture content of the chips delivered to the gas producing section of any apparatus in accordance with the invention is an important factor. In FIG. 2, the exhaust gases from the engine 17 were used in chip drying as by their introduction into the conveyer 12. In FIG. 4 if the moisture content of the chips to be delivered to the gas producers is too high, part of the hot gases from the burner 25C may be delivered to the conveyer 13C via the valve controlled conduit 37 and the conduit 20C.

In FIG. 4, the bagger 15C is shown as including a vibrator 38 and the bulk delivery 28C as a trailer body having a vibrator 39 therein, both vibrators operable to reduce bulk by about ten percent.

While the conveyors indicated in FIGS. 1 through 4 are continuous screw type conveyers for conveying short distances these distances may be increased by employing vehicles to transport particles to nearby locations should the location at which the particles are produced or are otherwise available be inappropriate to also operate the dryer section. It is intended, however, to keep such distances small in relation to the total distance over which the particles travel to the use site. In this way the transportation savings generated by the described method may be maximized.

Figure 5:
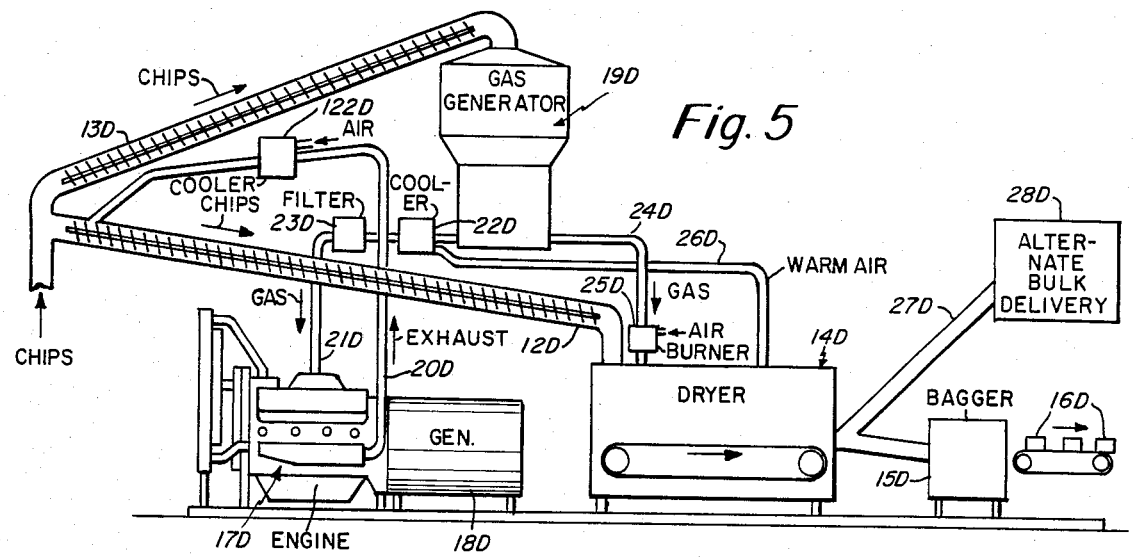
FIG. 5 is a schematic view of yet another embodiment of the invention, the apparatus of the type illustrated by FIG. 1 but with separate supplies of particles.

The embodiment of the invention illustrated by FIG. 5 is generally similar to that illustrated by FIG. 1 but is essentially a drying station as chippers are not shown as the particles may be produced elsewhere. The dryer 14D may be of the continuous or batch type and, if the latter, it may be charged and emptied by means other than conveyers. It will also be noted that the exhaust gases from the engine or turbine 17D are employed to assist in drying particles carried to the dryer 14D by the conveyer 12D.

Figure 6:
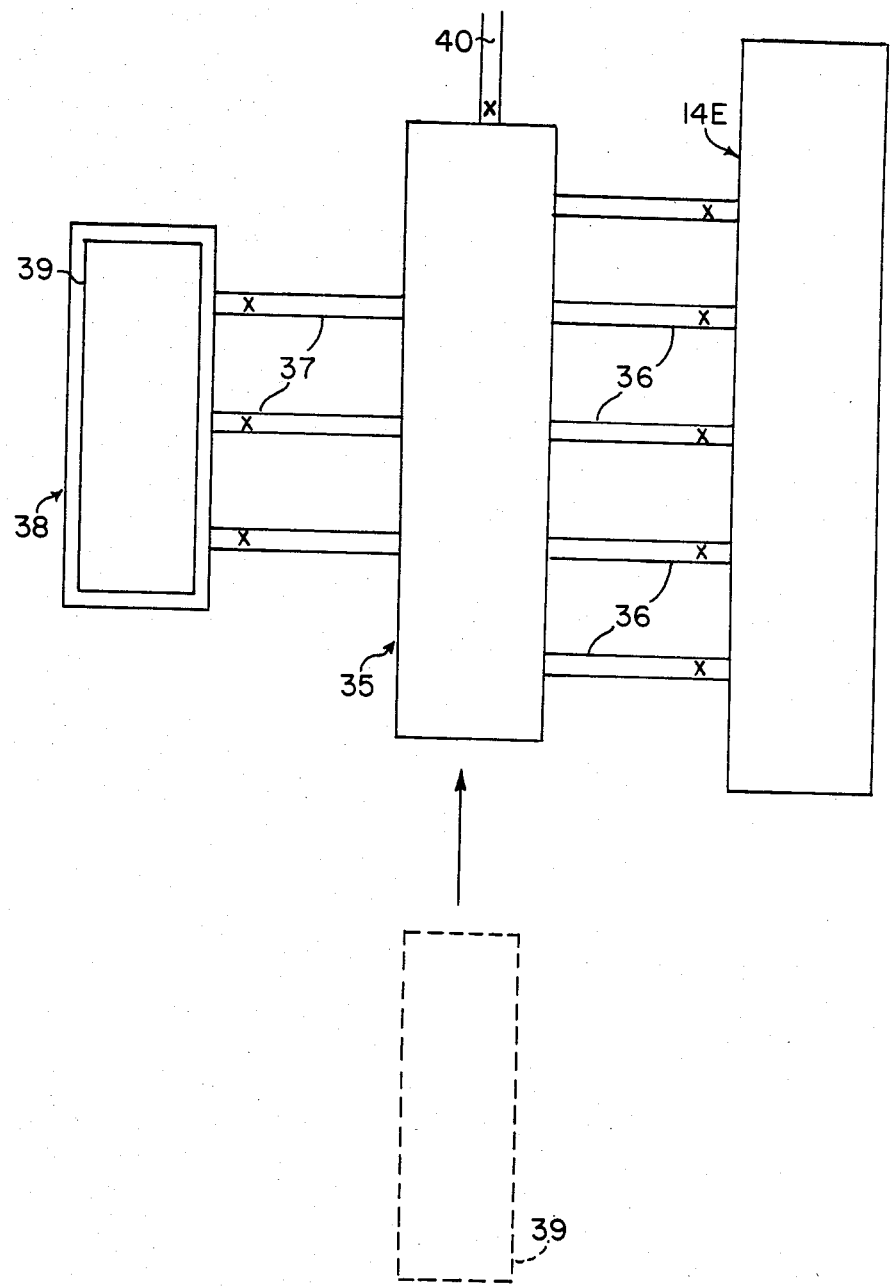
FIG. 6 is a like view of apparatus in which a minor portion of the hot gas is employed to effect particle drying at an additional station.

The embodiment of the invention schematically illustrated by FIG. 6, has a gas producing section, generally indicated at 25, which may have more than one gas producer of a type previously referred to.

The major portion of the producer gas produced in the section 35, is, as previously illustrated and described, delivered via valve controlled conduits 36 to the dryer 14E, after being burned and sufficiently cooled to enable the hot products of combustion to be used to dry particles therein. The dryer 14E may be of a batch type or one through which particles are continuously conveyed.

A minor portion of the hot gas produced in the section 35 is also delivered, via valve controlled conduits 37, burned and sufficiently cooled to enable it to be used in particle drying, to a drying station 38 which may be a portable dryer but is shown as of a type to accommodate a portable bin 39 which while of a capacity substantially less than that tof the dryer 14E, accommodates that volume of particles that, when suitably dried, enables a continuous drying operation to be started or that is required in the drying of a single batch, the dryer 14E then being of the batch type. In any case, the particles dried by the minor portion of producer gas are employed, when needed, as a fuel supply for the gas producing section, a bin 39 being shown in dotted line in position for that purpose.

A valve controlled conduit 40 is provided that may be used to deliver a minor volume of hot fuel gas from the gas producing section for another purpose or purposes, as fuel for an internal combustion engine, for one example.

While the method is generally apparent from the foregoing description of the apparatus, an important feature of the invention is that it requires only a minor part of a wood particle production to provide the needed energy to produce a dry particle output.

A summary of the invention and its operation is represented by the method which requires the delivery of particles as produced by commercially available hoggers or chippers properly operated and maintained from which particles such as splinters may be rejected if their presence interrupts particle flow to the gasifier, or to the dryer or if a similar condition applies to the conversion device which consumes the dry chips. The gas producing section provides at least one stream of hot fuel gas which is utilized in a manner to effect the reduction in the moisture content of the particles at the drying section to a wanted extend in the approximate range of 5%–40% (wet basis) with the relationship between the volume of particles utilized to produce hot fuel gas and the volume of dried particles such that the overall economic advantage is maintained. That relationship permits a minor portion of the hot fuel gas to be employed for such other purposes as to provide fuel for a prime mover by which energy is provided to operate particle forming equipment, conveyers, blowers, baggers and compactors or vibrators and additional drying or heating functions either during or prior to their delivery to a gas producing section.

Where the moisture content of the chips being delivered to the gas producing section of apparatus in accordance with any embodiment of the invention is too high, part of the hot products of combustion may be directed to ensure that the delivered chips are suitably dry.

It will be apparent that wood particles in accordance with the invention will absorb moisture under normal atmospheric conditions unless suitably protected. Discussion above relative to the potential costs of packaged fuel in accordance with the invention utilized a final moisture content of fifteen percent. A desired final moisture content in the approximate range of from five percent to forty percent may be practiced to reach the requirements of a specific end use.

A situation where economic advantage exists for drying only to forty percent wet basis is when it is desired to consume soft wood which naturally contains more water than hard wood in a system designed for hard wood. In this instance the removal of only a small fraction of the water creates a market for soft wood particles which could otherwise not be used.

Reference has been made to the packaging of dried particles to provide fuel units. The dried wood chips are packaged or shipped in bulk with a volume reduction in the neighborhood of ten percent affected by vibration. The drying process reduces the volume of the particles by about ten percent. When this reduction in volume is utilized by topping up the load with dry chips the volume capacity and the weight capacity of a vehicle can be achieved simultaneously.

Particles used for chemical feed stock as with particles used for fuel benefit from both types of conversion processes by virtue of reducing final product costs, improving the final operation of the process and thereby enhancing the value of the dried particles.

We claim:

1. The method of preparing harvested wood, bark and like biomass material for consumption as a fuel or chemical feed stock where control of particle size and moisture content are requirements, said method consisting of the steps of utilizing particles produced from the harvested material at or near the harvesting site or other remote sites with substantially all of the particles having a moisture content too high for most economical use, providing a path to a gas producing station for particles, providing particles for said station of sizes produced by conventional chippers and delivering said particles to said station along said path, subjecting the conveyed particles to gasification at that station to provide at least one stream of hot fuel gas, delivering particles to a drying station of sizes produced by conventional chippers and hoggers, utilizing the hot fuel gas in said one stream to dry the particles at said station by introducing ambient air into and burning the fuel gas in a manner to reduce the temperature of the resulting hot products of combustion to an extent enabling the moisture content of the particles at the drying station to be reduced without affecting them adversely for their wanted consumption thereby to effect at least one of said requirements and establishing the relationship between the conveyed particles and the delivered particles that results in the moisture content of the particles at the drying station being reduced to a desired extent in the approximate range of from five to forty percent and delivering the thus dried particles to a consumption site.

2. The method of claim 1 in which the delivered particles are conveyed along a second path to the drying station.

3. The method of claim 2 in which the particles are continuously conveyed through the station.

4. The method of claim 2 in which the conveyed particles are held at the station in batches.

5. The method of claim 1 in which particles are delivered in batches to the drying station.

6. The method of claim 1 in which there are a plurality of streams of hot fuel gas, one major stream and at least one minor stream, said major stream utilized to effect drying at said drying station, and said minor stream utilized to effect at least one of said requirements prior to particle delivery to at least one of said stations.

7. The method of claim 6 in which a second drying station is provided, delivering particles thereto in batches, and utilizing the hot fuel gas in said minor stream to dry the particles at the second drying station by burning the gas and reducing the temperature of the resulting hot products of combustion to enable the moisture content of the particles at said second station to be reduced without affecting them adversely for their wanted consumption.

8. The method of claim 1 and the additional step of cleaning and cooling the hot fuel gas in the minor stream to a temperature appropriate for use in a power plant operable thereby and providing the energy for the particle conveying step, utilizing the cleaned and cooled gas of said minor stream as fuel for said power plant.

9. The method of claim 8, and the additional step of producing said particles and utilizing energy produced by said power plant in the production thereof.

10. The method of claim 1 in which at least two streams of hot fuel gas are provided and the additional step of cleaning and cooling the hot fuel in the other stream to a temperature appropriate for use in a power plant operable thereby, and producing said particles utilizing energy provided by said power plant.

11. The method of claim 1 in which the volume of the particles utilized to provide the hot fuel gas is that minor part of the particle production determined by the efficiency of the gas producing step.

12. The method of claim 1 and the step of elininating from the particles delivered to said station slivers three inches or more in length.

13. The method of claim 1 and the step of limiting the size of the particles delivered to the drying station to those that will pass through a one and one-half inch mesh screen but not through a one-half inch mesh screen.

14. The method of claim 1 in which the efficiency of the gas producing step is approximately ninety percent and the volume of particles subjected to gasification is not in excess of 15% of the particle production.

15. The method of claim 8 in which the efficiency of the gas producing step is approximately ninety percent and the volume of particles subjected to gasification is about 12½% of the particle production.

16. The method of claim 9 in which the efficiency of the gas producing step is approximately ninety percent and the volume of particles subjected to gasification is about 18½% of the particle production.

17. The method of claim 10 in which the efficiency of the gas producing step is approximately ninety percent and the volume of particles subjected to gasification is about 13% of the particle production.

18. The method of claim 1 and the additional step of packaging the dry chips within combustible material that provides protection against moisture absorption and in a manner providing fuel units that are of substantially uniform size and weight.

19. The method of claim 1 in which the drying step reduces the moisture content of the particles below that of the particles if dried normally in the open air to an extent dependent on the type of equipment in which the particles are to be burned.

20. The method of claim 1 in which the drying step reduces the moisture content of the particles to a moisture content within the approximate range of from five to eight percent and the particles are for use as fuel in stoves, heaters, and furnaces where the combustion chamber is air tight.

21. The method of claim 1 in which the drying step reduces the moisture content of the particles to a moisture content within the approximate range of from nine to sixteen percent and the particles are for use in stoves and heaters where the combustion chamber is not air tight.

22. The method of claim 1 in which the drying step reduces the moisture content of the particles to a moisture content within the approximate range of from seventeen to forty percent and the particles are for use as an all purpose fuel.

23. The method of claim 1 in which the processing step provides wood particles within two different size ranges and the delivery step delivers the particles of the smaller size range along the first path and the particles of the other size range along the second path.

24. The method of claim 23 and the additional step of diverting thereto that portion of the particles from the first path to the second path that is in excess of that required by the gas producing step.

25. The method of claim 1 and the additional step of compacting and carrying the particles to a remote site while protecting the particles against absorbing moisture.

26. The method of claim 8 and the further step of utilizing waste heat from the power plant to effect particle drying.

27. The method of claim 26 in which the waste heat is derived from the cooling of the power plant.

28. The method of claim 26 in which the waste heat is exhaust gas from the power plant.

29. The method of claim 26 in which said waste heat is employed to effect the drying of particles being conveyed along one of said paths.

30. The method of claim 29 in which the path in which particles are subjected to being dried by said waste heat is the path for the particles subject to gasification.

31. The method of claim 10 and the additional step of utilizing heat derived from the cooling of the gas to effect particle drying.

32. Apparatus for preparing wood, bark and like biomass materials at or near the site or sites where they are harvested in the form of particles for consumption as a fuel or chemical feed stock where control of particle size and moisture content are requirements with substantially all of the particles having a moisture content too high for most economical use, said apparatus including a drying section, means to deliver particles thereto of sizes produced by conventional chippers and hoggers, a gas producing section including at least one gas generating means operable to consume particles and produce hot fuel gas, means to deliver particles to said gas generating means of sizes produced by conventional chippers, means to introduce ambient air into and means to burn the major portion of said hot fuel gas and to deliver the hot products of combustion to said drying section at a temperature suitable for there reducing the moisture content of particles without adversely affecting their use for the wanted consumption, said generating means of a type enabling a total hot fuel gas production to be attained with a volume of particles less than the volume of particles dried thereby with the ratio between the two volumes such that the moisture content of the particles is reduced to a wanted extent in the approximate five to forty percent range.

33. The apparatus of claim 32 in which there are means to utilize a minor portion of the hot fuel gas in a manner to effect at least partially at least one of said requirements prior to the delivery of said particles to at least one of said sections and means to deliver a minor portion of the hot fuel gas to said last named means.

34. The apparatus of claim 32 in which said last named means includes a power plant and the means to deliver said minor portion of the hot fuel gas thereto includes means operable to clean and cool said hot fuel gas so as to render said hot gas suitable for use as fuel for the power plant.

35. The apparatus of claim 34 and particle forming means operated by said power plant.

36. The apparatus of claim 34 and particle conveying means operated by said power plant.

37. The apparatus of claim 32 and means to utilize heat derived from the gas cooling means to affect particle drying.

38. The apparatus of claim 32 in which the means to deliver particles to the drying section is a conveyor.

39. The apparatus of claim 32 in which there is means operable to bag dried particles in combustible material to provide fuel units of substantially uniform size and weight protected against moisture absorption.

40. The apparatus of claim 38 and the particle forming means is of a type operable to produce particles within a substantial size range, and means operable to deliver particles within one part of said range to the gas producing section and the remaining part of that range to the conveyor to the drying section.

41. The apparatus of claim 37 and means to deliver that part of the particles being delivered to the gas producing section to the dryer that is not required for the efficient operation of the gas producing section.

42. The apparatus of claim 40 in which the particle forming means includes two chippers, each operable to produce one part of said range.

43. The apparatus of claim 40 and means to screen the particle production to establish the two parts of the size range thereof.

44. The apparatus of claim 32 in which the gas producing section includes two parallel gas producers, one having a fuel producing capacity greater than the other and for use in supplying said major portion of hot fuel gas.

45. The apparatus of claim 32 and means to deliver a minor part of the hot products of combustion from said burner means to the means conveying particles to the gas producing section to effect the heating thereof.

46. The apparatus of claim 34 and means operable to utilize the waste heat from said power plant to effect the drying of particles.

47. The apparatus of claim 46 in which said means receives exhaust gas from the power plant in a manner to enable it to be used as said waste heat and said waste heat is delivered to the particles for use at the gas producing section.

48. The apparatus of claim 32 in which there is a second dryer section for use in drying particles that are to be consumed in the gas producing section, and means to burn a minor portion of the hot fuel gas and to deliver the hot products of combustion to the second dryer section at a temperature suitable for reducing the moisture content of the particles to a wanted extent without adversely affecting them.

49. The apparatus of claim 48 in which the second dryer section is of a type effecting the drying of particles in batches.

50. The apparatus of claim 32 in which the means to deliver particles to the gas producing section includes means to eliminate from the delivered particles, slivers three inches or more in length.

51. The apparatus of claim 32 in which the means to deliver particles to the gas producing section includes means to limit the size of the delivered particles to those that will pass through a one and one-half inch mesh screen but not through a one-half inch mesh screen.

* * * * *